Dec. 18, 1951  H. B. DONLEY  2,579,371
PILOT BURNER
Filed Oct. 11, 1947

Inventor
Harold B. Donley
by Parker & Carter
Attorneys.

Patented Dec. 18, 1951

2,579,371

UNITED STATES PATENT OFFICE 2,579,371

PILOT BURNER

Harold B. Donley, Columbus, Ohio, assignor to Columbus Metal Products, Inc., Columbus, Ohio, a corporation of Ohio Application October 11, 1947, Serial No. 779,357

1 Claim. (Cl. 158—91)

This invention relates to a pilot light for use in a fuel burner. It has for one object to provide a pilot burner suitable for use in the so-called "pot type" burner.

Another object is to provide a pilot burner which can be supplied with fuel through the main source from which the burner as a whole is normally supplied during combustion.

A still further object is to provide a pilot burner arranged to discharge its flame directly toward the zone of primary vaporization of the main burner.

Other objects will appear from time to time in the specification and claims.

The invention is illustrated more or less diagrammatically in the accompanying drawings, wherein.

Like parts are indicated by like characters in the specification and drawings.

Figure 1:
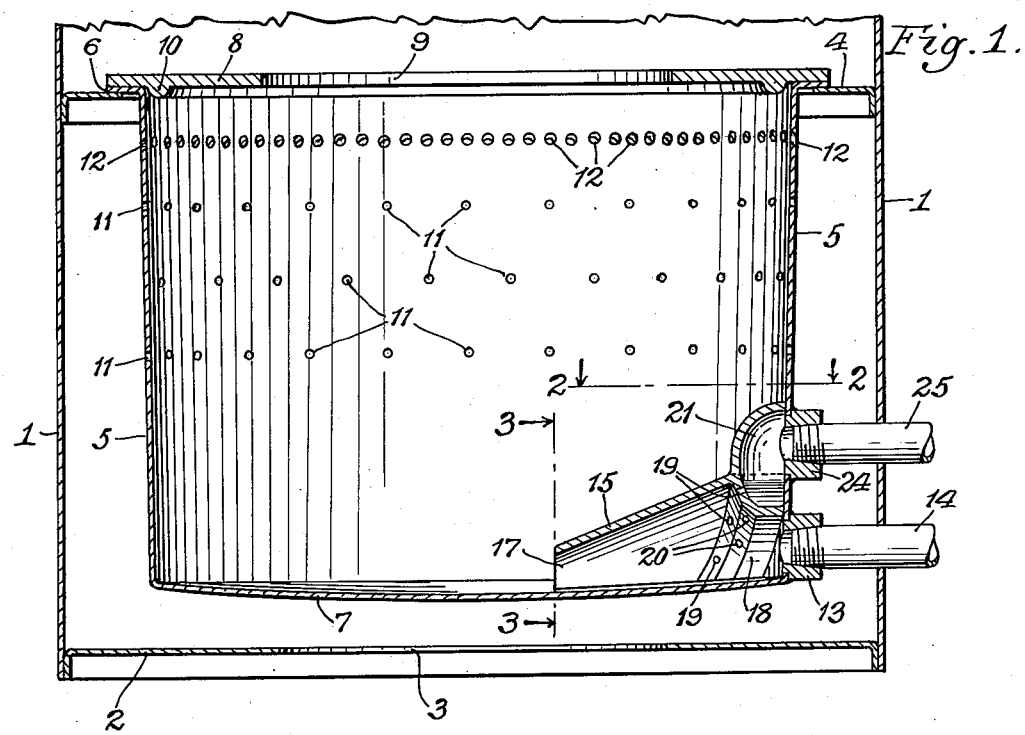
Figure 1 is a vertical section of the pilot in position in one form of burner to which it may be applied.
Figure 3:
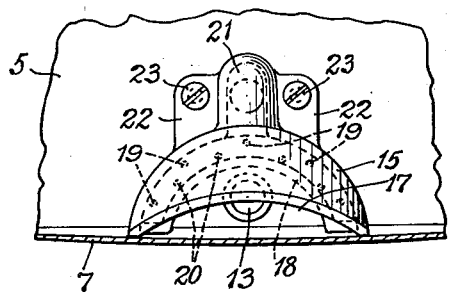
Figure 3 is a vertical sectional detail taken at line 3—3 of Figure 1 and showing the pilot in front elevation.
Figure 2:
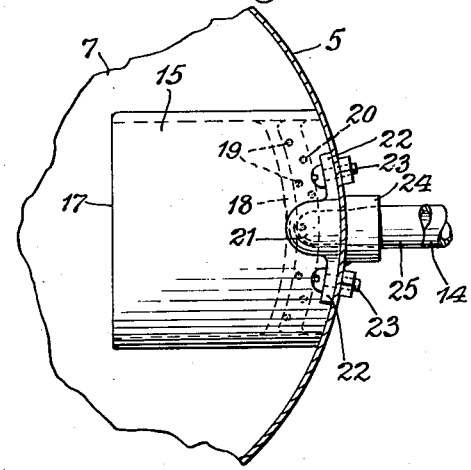
Figure 2 is a horizontal sectional detail taken at line 2—2 of Figure 1 and showing the pilot in plan.

1 is a burner wall or housing which is partially closed by a plate 2 provided with an opening 3. A ledge member 4 is fixed within the housing 1 and supports a burner pot 5 which may be provided with a lateral flange 6. This flange rests upon the ledge 4. At its bottom the pot 5 is closed by a plate 7. In this form the plate is integral with the wall of the pot 5. A flame plate 8 may rest upon the upper open end of the pot 5. It is provided with a central opening 9 and with a spacing annular member 10.

The pot itself is provided with a plurality of rows or groups of holes 11 arranged above its bottom. Toward its top it is provided with a row or group of upwardly inclined holes 12.

The pot is provided with a nipple 13 into which is threaded a fuel conduit or pipe 14.

The pilot includes a member 15 provided with an open bottom and shaped to fit upon the bottom 7 of the pot of the main burner. The member 15 is downwardly inclined in the direction of the center of the pot and is provided with an open end 17. Toward its upper or outer end the pilot is provided with a wall member 18 which may have one or more rows or groups of perforations 19 or 20. Ordinarily only one such group of perforations will be present, but, if desired, both may be used. An upward and preferably integral extension 21 is formed on the member 15. The interior of the extension 21 is separated from the interior of the pilot wall member 18. Lateral extensions 22, preferably integral with the members 15 and 21, are perforated to receive bolts, screws or other fastening members 23.

A nipple 24 is fixed in an appropriate perforation in the wall 5 of the pot. This nipple has threaded into it an air inlet or conduit 25 through which air enters from outside of the main burner structure.

It will be realized that although I have illustrated and described an operative device, still many changes may be made without departing materially from the spirit of my invention, and I wish, therefore, that my showing be taken as in a broad sense illustrative and diagrammatic rather than limiting me to my precise showing.

The use and operation of this invention are as follows:

In the particular form shown, the pilot is assembled in a burner pot which includes the wall 5 and the bottom 7. The burner pot forms a bottom for the pilot and also a partial rear wall for the pilot. The space bounded by the wall 18 and the extension 21 is closed by the side wall of the pot 5. Although the pot shown is round, it might be of any shape, and the shape which would then be given to the pilot structure would be such that the pilot structure would fit closely against the burner pot wall no matter what the shape of the latter might be.

Air for the main combustion in the main pot enters through the opening 3, passes upwardly about the space bounded by the members 1 and 5, and enters the pot through the holes 11. This may be considered the primary air. As the fuel within the main pot vaporizes it passes upwardly in the form of a rich mixture. Secondary air is added to this mixture through the holes 12, and combustion takes place toward or at the upper margin of the pot 5, flames generally extending through the opening 9. The heat of this combustion is effective in carrying out the necessary vaporization for continued burning. All of the fuel burned in the main pot, as well as the fuel burned in the pilot, passes through the conduit 14 and through the interior of the pilot. The fuel which is not burned in the pilot moves generally as a liquid along the plate 7 and is discharged through the opening 17 of the pilot into the pot 5. There it is vaporized or further vaporized and mixed with the air entering through the openings 11 and 12, and burned as above mentioned. When full burning of the main burner is not desired, the quantity of fuel entering through the conduit 14 is reduced to that point at which it will merely supply fuel for the necessary combustion of the pilot light. Air enters the pilot from the conduit 25, and after passing through the extension 21, is discharged into the interior of the pilot through the openings 19 or 20. Whether one or two rows or groups of openings be provided, the result is the same. They furnish air for primary evaporation and form the initial mixture of fuel and air. This mixture is ignited, usually manually, and burns toward the discharge end of the pilot, that is to say, toward the opening 17. At that point some secondary or additional air may be mixed with the flame or mixture of fuel. The pilot thus provides means for maintaining a limited flame within the main pot. When it is desired to re-light the burner as a whole, the quantity of fuel entering through the conduit 14 is increased beyond that necessary to support the limited pilot combustion. This additional fuel enters the pot 5 unburned and mixes there with the additional air present in that pot and rises as above described, being further mixed with the secondary air entering the perforations 12. Under these conditions the main combustion within the burner itself is established and continues as long as adequate fuel is furnished to support it. When the quantity of fuel is thereafter reduced to a point below that necessary to support combustion within the main pot 5, that combustion stops, and the pilot combustion adjacent the opening 17 in the pilot continues until the quantity of fuel is again increased.

I claim:

For use in a burner having a pot which includes a bottom wall and a side wall, a generally imperforate walled pilot structure adapted to be positioned within a pot, said pilot structure including wall portions having side and bottom edges adapted to contact the side and bottom walls of a pot and to define, with the side and bottom walls of a pot, a mixing chamber adapted to receive a liquid fuel supplied to such a pot, said pilot structure including wall portions adapted to define, with a pot side wall, a plenum chamber super-posed over that portion of the mixing chamber closest to the pot side wall, said plenum chamber having a radial extension inwardly toward the center of the pot, substantially less than that of the mixing chamber, and being outwardly open to the pot side wall when the pilot structure is in position in a pot, whereby it is adapted to receive an air supply through the side wall of the pot, the pilot structure including a partition positioned and adapted to separate the plenum chamber from the mixing chamber, said partition having therein a plurality of air inlet apertures adapted to direct air jets from the interior of the plenum chamber to the interior of the mixing chamber, the mixing chamber having a top wall extending downwardly and inwardly from the plenum chamber, said top wall being generally arcuate in transverse cross-section, and having side edge portions which, when the pilot structure is in position in a pot, are adopted to engage the bottom of the pot, the said top wall defining at its inner edge a lip adapted to define, with the bottom wall of a pot, an upwardly arched flame opening.

HAROLD B. DONLEY.

REFERENCES CITED

The following references are of record in the file of this patent:

UNITED STATES PATENTS

| Number | Name | Date |
|---|---|---|
| 2,369,833 | Livar | Feb. 20, 1945 |